(12) United States Patent
Mann et al.

(10) Patent No.: US 8,063,366 B2
(45) Date of Patent: Nov. 22, 2011

(54) SCANNING METHOD AND APPARATUS

(75) Inventors: Christopher Mark Mann, Cornwall (GB); David John Coombs, Witney (GB); Marc Ferlet, Blewbury (GB)

(73) Assignee: ThruVision Systems Limited, Abingdon, Oxfordshire (GB)

( * ) Notice: Subject to any disclaimer, the term of this patent is extended or adjusted under 35 U.S.C. 154(b) by 811 days.

(21) Appl. No.: 11/915,603

(22) PCT Filed: Jun. 2, 2006

(86) PCT No.: PCT/GB2006/002034
§ 371 (c)(1),
(2), (4) Date: Jul. 2, 2008

(87) PCT Pub. No.: WO2006/129113
PCT Pub. Date: Dec. 7, 2006

(65) Prior Publication Data
US 2011/0133087 A1    Jun. 9, 2011

(30) Foreign Application Priority Data
Jun. 2, 2005 (GB) .................................. 0511209.9

(51) Int. Cl.
*G01J 5/02* (2006.01)
(52) U.S. Cl. ...................................... 250/330; 250/353

(58) Field of Classification Search .................. 250/330, 250/338.1, 339.06, 339.07, 341.1, 341.8, 250/353, 358.1
See application file for complete search history.

(56) References Cited

U.S. PATENT DOCUMENTS
| 4,564,757 A | 1/1986 | LaBudde et al. |
| 2004/0149909 A1 | 8/2004 | Vaidya et al. |

FOREIGN PATENT DOCUMENTS
| WO | 2004/038854 | 5/2004 |
| WO | 2004/038854 A2 | 5/2004 |
| WO | 2005/026833 | 3/2005 |
| WO | 2005/026833 A2 | 3/2005 |

OTHER PUBLICATIONS
International Search Report for PCT/GB2006/002034 mailed Sep. 11, 2006.

*Primary Examiner* — Mark R Gaworecki
(74) *Attorney, Agent, or Firm* — Nixon & Vanderhye PC

(57) ABSTRACT

In a terahertz imaging system, a scanning component for scanning a field of view is tracked by an optical beam to obtain positional information. The optical tracking beam can be steered by the scanning component for example by reflection, refraction or diffraction. The steered tracking beam can then be detected by a spatially sensitive detector such as a charge-coupled device array. In a preferred embodiment, the output of a terahertz detector receiving terahertz radiation from the scanned field of view is used to modulate the tracking beam. This means that the spatially sensitive detector can provide an image directly derived from the scanning of the field of view by the terahertz radiation.

18 Claims, 14 Drawing Sheets

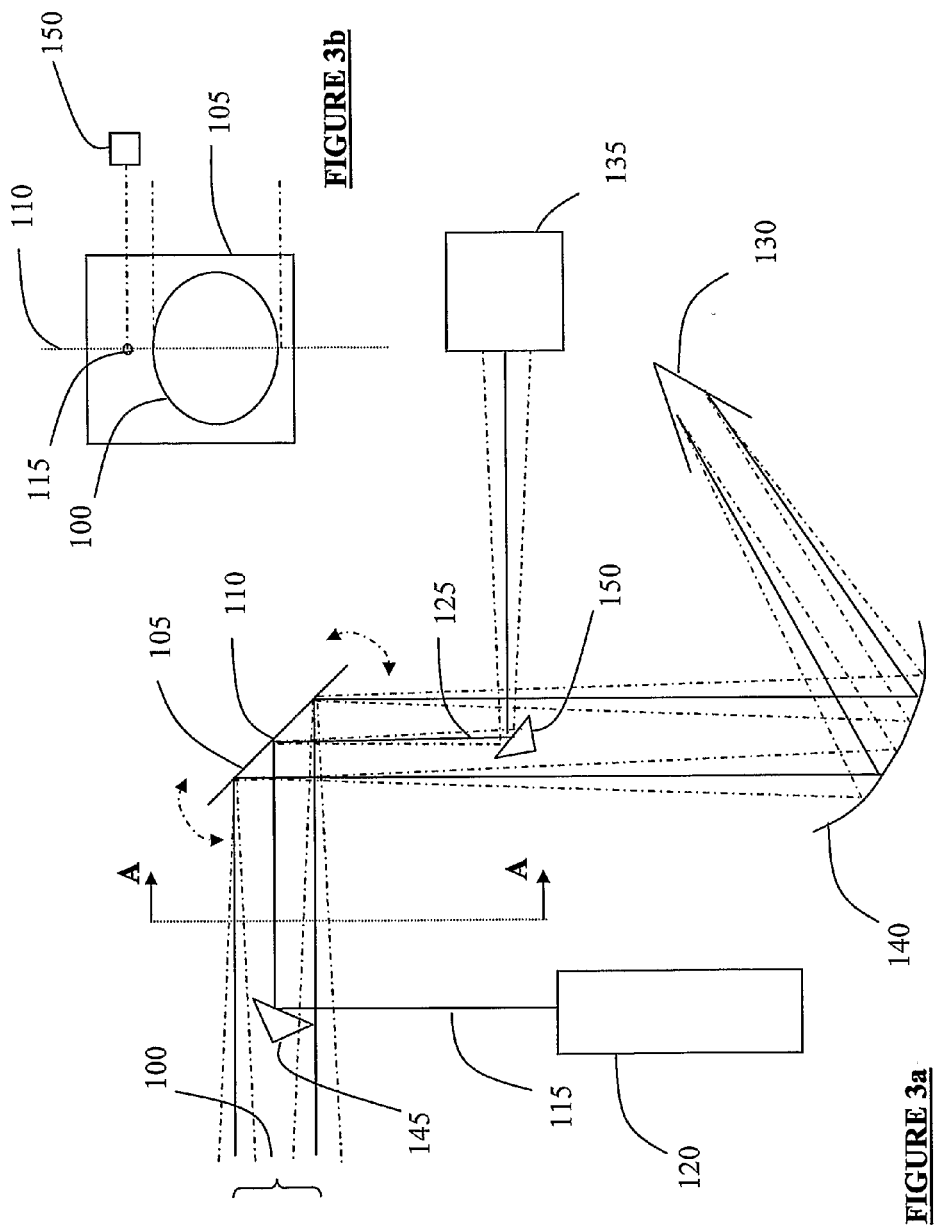

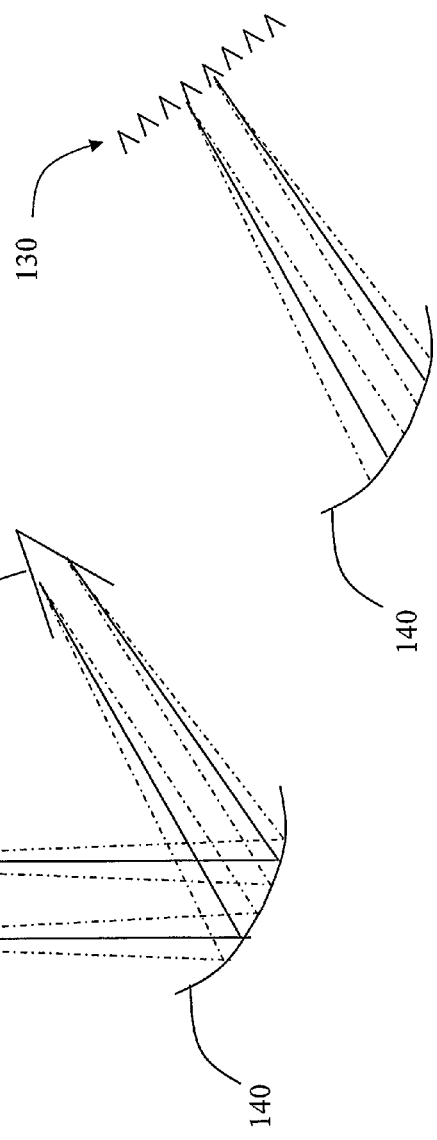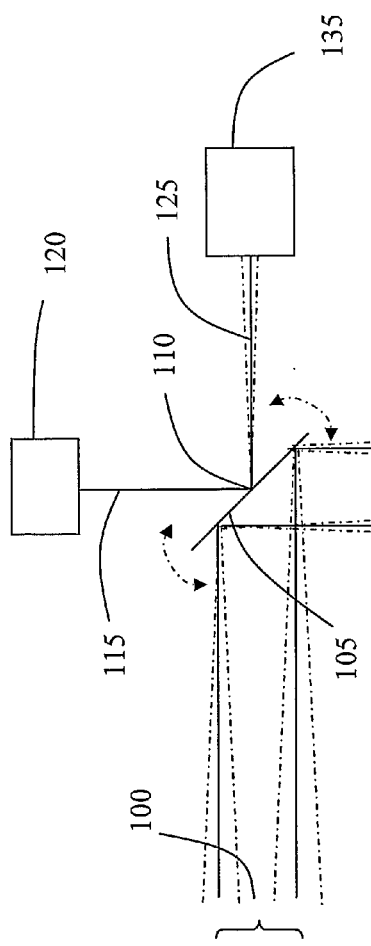

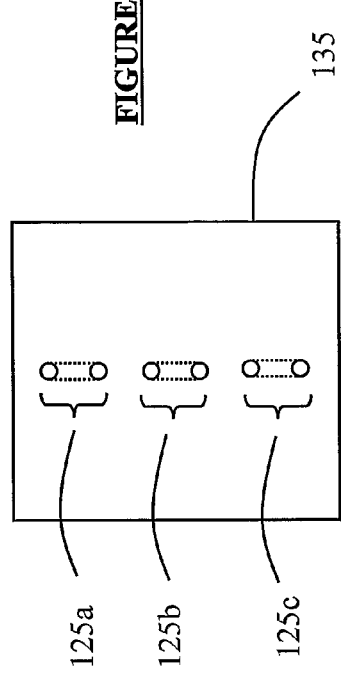
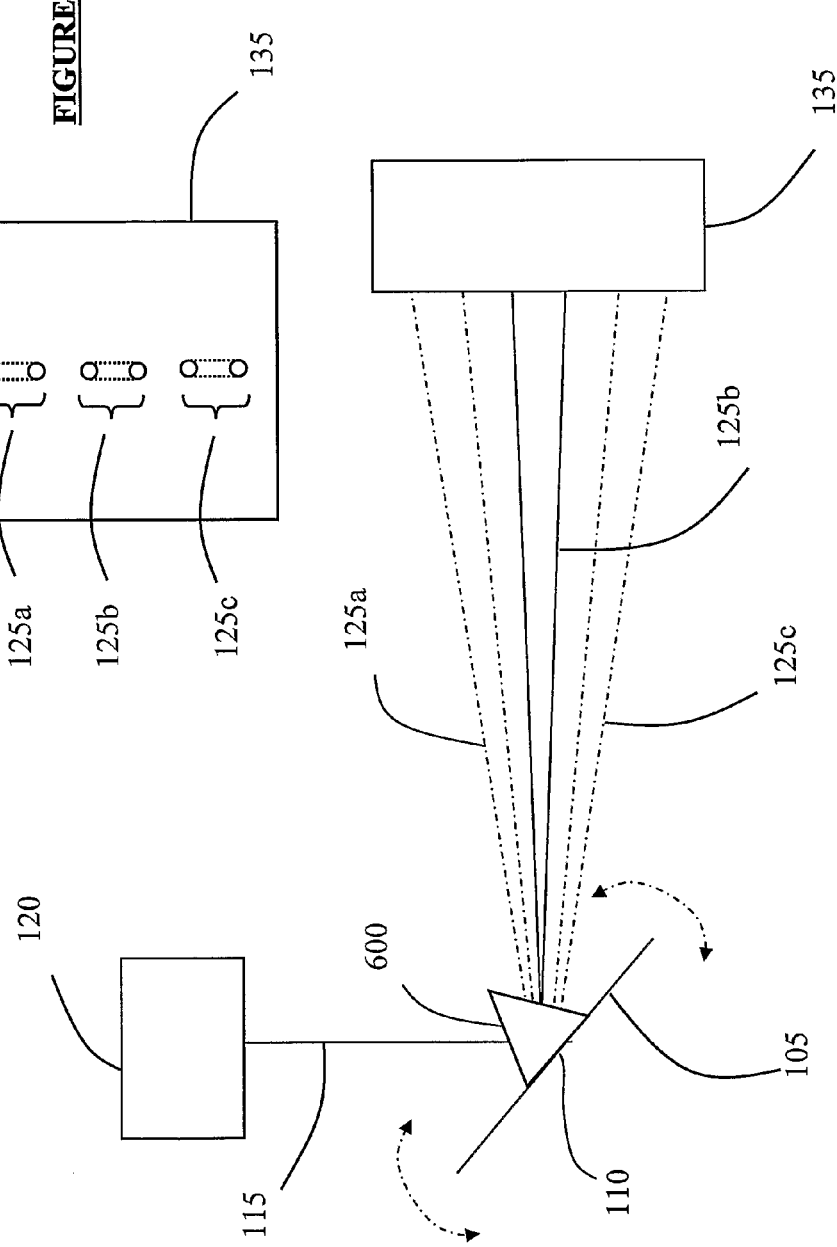

SCANNING METHOD AND APPARATUS

This application is the U.S. national phase of International Application No. PCT/GB2006/002034 filed 2 Jun. 2006 which designated the U.S. and claims priority to Great Britain Application No. 0511209.9 filed 2 Jun. 2005, the entire contents of each of which are hereby incorporated by reference.

The present invention relates to a scanning method and apparatus for use in imaging objects using the electromagnetic spectrum at wavelengths in the millimeter to sub-millimeter range and particularly but not exclusively to arrangements based on heterodyne detectors.

The range mentioned above is referred to herein generally as the terahertz spectrum. Terahertz radiation has been found a useful tool for imaging and other purposes because some materials are transparent to it which are opaque through the visible spectrum. This allows these materials to be "seen through" using terahertz radiation where they could not using visible optical radiation. For example, terahertz wavelengths have been used in imaging the earth's surface through the atmosphere and for improving visibility in bad weather (for example for flying or driving). Some materials can be distinguished under terahertz radiation because of their distinctive transmissivity or reflectivity and this has been used for example in detecting food or chemical components. Further, objects themselves can emit terahertz radiation, including the human body. This has been used for example in medicine for detecting skin cancer. Because clothing is generally transparent to terahertz radiation but weaponry is not, another application has been the detection of weaponry otherwise concealed about the person.

Cameras for imaging an object by use of the terahertz spectrum are known. For example, an arrangement is described in International Patent Application WO 2004038854 in the name Zinn et al. In this arrangement, the camera is based on a double bank of horn antennae which each pick up terahertz radiation, in use, which is mixed to extract an intermediate frequency signal using a local oscillator. This known heterodyne technique allows smaller detectors to be used at room temperature in the terahertz range than might otherwise be necessary and so supports finer resolution. However, each detector still has dimensions of the order of 0.2-10 mm.

To produce an image of a field of view with any reasonable level of resolution using terahertz detectors, there would need to be an extensive array of terahertz detectors. Even if such arrays were available, they would be expensive and physically impractical in many situations. To solve this problem, it is known to move an array of detectors across the focal plane of a fixed objective lens so as to scan a field of view. Such an arrangement is shown in international patent application WO 2005/026833 in the name Council for the Central Laboratories of the Research Councils, filed on 15 Sep. 2004. To track the movement of the detectors, each one has a retro-reflector for radiation at non-terahertz frequencies which is illuminated during scanning to give the spatial position of the respective detectors. However, although effective, this is a slow method of scanning given the physical bulk of the detectors.

It is also known to use a mechanical scanning system to deliver the image to detectors which are themselves in fixed positions in relation to the field of view. This can be either to a single detector or to an array of detectors. In WO 2004038854, the terahertz radiation is delivered to the double bank of horn antennae by a scanning system comprising scanning minors which provide a degree of focussing. Such an arrangement allows faster scanning rates than the moving detectors of WO 2005/026833.

In order to process data collected by the terahertz radiation detectors into image data, it is necessary to correlate the location in a field of view which is being scanned with the output of the detector or detectors. In known systems this has been done by using a drive system for the scanning mirrors which is capable of providing positional data. For example, servo motors known for use in driving scanning minors can be obtained which have a positional data output.

There is an ongoing requirement for faster image capture. Real-time imaging at five to fifty frames per second ("5-50 fps") is now a target and in answer to this need many scanning mechanisms have been suggested to achieve a full raster. Because of the speed issue, these usually comprise rotating off-axis plane mirrors that can produce either a circular raster pattern or a quasi-linear raster.

There are factors special to terahertz radiation detectors however which work together to limit the speed with which an image can be built. The detection system has to build an image as pixels, each pixel relating to a location on the target. Enough data has to be collected per pixel to produce resolution in spite of noise in the system. Terahertz detection is subject to significantly higher noise levels than optical detection. In order to collect enough data per pixel, sufficient time has to be given to build each pixel. This can be speeded up to a certain extent by using data from more than one detector in relation to a pixel but a problem arises with the sheer physical size of individual terahertz radiation detectors. If multiple detectors are used to build up each pixel, this increases not only complexity but also image degradation as detectors contributing to a pixel are positioned further and further off the optical axis.

In optical imaging, it is possible to build an array of detectors so that the area of the array covers an image produced across the whole field of view and there can be a one-to-one relationship between detectors and image pixels. Data can be collected for all the pixels of an image at the same time, across an array of detectors. Alternatively, an imaging beam can be scanned across the detectors. In either case, there is a simple relationship between the detectors and pixels of the image which makes it easy to correlate incoming data with position on the image. This cannot be replicated with terahertz radiation detectors again because of the sheer physical size (and cost) of individual terahertz radiation detectors. The problem can be solved using a single detector, or a limited array of detectors, and building the image pixel by pixel to a level sufficient to overcome the inherent noise in the system. However, even where there is an array of terahertz detectors, there cannot be anything like the same simple relationship between detectors and pixels as there can be in optical imaging and the process of building an image is slow.

It would be possible to speed up the rate of scanning across a field of view in collecting an image by terahertz radiation. Rotating mirrors are mentioned above but the sheer mass of an appropriate rotating mirror is too great to allow high speed scanning. There are other scanning mechanisms which are faster. However, there would be no obvious point in using a faster scanning mechanism if the detectors cannot collect data above the inherent noise level in the system and, further, known faster scanning mechanisms do not give a positional data output. It then becomes a problem to relate detector outputs to location in the field of view.

According to a first aspect of the present invention, there is provided a scanning system for scanning a field of view to provide a scanned terahertz radiation input to at least one terahertz radiation detector, for use in imaging the field of view, wherein said scanning system comprises at least one mobile component adapted to steer terahertz radiation to provide said scanned terahertz radiation input, and wherein said mobile component is also adapted to steer an electromagnetic tracking beam during scanning, for use in tracking movement of the mobile component.

"Terahertz" in this context means the electromagnetic spectrum at wavelengths in the millimeter to sub-millimeter range.

Embodiments of the invention can solve the problem of relating detector outputs to location in the field of view by tracking the movement of the mobile component directly, using the electromagnetic tracking beam.

In embodiments of the present invention, movement of the mobile component provides scanning across the field of view. Thus the at least one terahertz radiation detector can be mounted in use in a fixed position relative to the field of view. This supports much higher scanning speeds than systems in which scanning is provided by movement of one or more detectors.

The mobile component will generally comprise a steering structure for steering terahertz radiation, such as a reflective surface, and an actuator for generating movement of the steering structure. A suitable mobile component might be for example a resonant scanning mirror (further discussed below) which might have for example a solenoid-based actuator.

Information obtained by tracking could be combined in various ways with the output of the at least one terahertz radiation detector. However, in a preferred embodiment of the present invention, the tracking information can be used in driving a display device and the output of the at least one terahertz radiation detector can be used in modulating the display signal to give an image. The image then seen on the display device will be an image obtained by changes in terahertz radiation received from the field of view.

In such an arrangement, it becomes possible to scan the field of view at much higher rates than would otherwise be possible from the image processing point of view. For example, refresh rates of 5-50 fps become available because scanning can be done an order of magnitude faster than available with known imaging systems based on terahertz radiation. It is no longer necessary to have explicit data relating to a scanning regime, or the computational overhead involved in relating that data to the pixels of a display.

It will be understood that a modulated signal obtained by combining tracking information with the output of the at least one terahertz radiation detector is not necessarily fed directly to a display device but could instead for instance be stored or transmitted elsewhere.

It has been recognised in making the present invention that a tracking beam can be "inserted" to the scanning system simultaneously with use of it to scan a target using terahertz radiation without significantly lowering performance. It has also been realised that although the primary purpose of the scanning mechanism is to scan across a target and deliver information to a fixed point or points (one or more terahertz radiation detectors), this mechanism can very usefully be used in reverse to create a simultaneous scanned output from a fixed input. That is, a fixed tracking beam can be input to the scanning mechanism to get an output which is scanned across a spatially sensitive tracking beam detector.

It has further been recognised that, in embodiments of the present invention, the scanning system no longer needs to provide positional data for the mobile component since it can be tracked by the tracking beam. Any scanning system might then be used, not necessarily one using a servo motor.

A scanning system according to an embodiment of the invention may further comprise an electromagnetic beam source for delivering a tracking beam to the mobile component to be steered thereby.

A suitable tracking beam is an optical beam. "Optical" in this context means electromagnetic radiation in the region 0.2 to 10 microns or from the ultra violet through to the far infrared region. The use of an optical tracking beam means that advantage can be taken of existing technology in the optical field for converting data collected by use of scanning to an image signal for providing a visual image of a scanned field of view.

There are various ways in which the electromagnetic tracking beam can be steered by the mobile component. It could be steered in the same way as the terahertz radiation is scanned, for instance by being reflected from a surface of the mobile component. However, it may be preferable that the mobile component comprises both a terahertz scanning element, such as a reflective surface, and a steering element for the electromagnetic beam. For example, the steering element may comprise a reflective surface outside the beam path of the terahertz radiation in use of the system. The reflective surface for scanning the terahertz radiation may simply extend beyond said beam path to provide the steering element for the electromagnetic beam, or it might be provided on a different surface of the mobile component, for instance on the reverse with respect to a reflective surface for scanning the terahertz radiation.

The steering element may take any of several different forms. As mentioned above, it may comprise a reflective surface. It may also or instead comprise refractive material for steering the tracking beam at least partially by refraction. For example, the steering element may comprise a refractive layer of the mobile component, and/or a prism. The use of refractive material has the advantage for example that it allows color separation with respect to a broadband electromagnetic source which can increase accuracy of the tracking. The steering element may further or instead comprise a diffractive element for steering the tracking beam at least partially by diffraction. For example, the steering element may comprise a diffraction grating. This allows more than one order of tracking information to be obtained which can for example improve the signal to noise ratio in the tracking information obtained.

A scanning system according to an embodiment of the invention may further comprise a spatially sensitive detector for detecting the position of the steered electromagnetic tracking beam in use of the system. For example, a spatially sensitive detector suitable for the purpose comprises a charge coupled device array. Such devices are already known for use in optical imaging.

Preferably, the spatially sensitive detector further comprises a sheet of material having a scattering property with respect to the electromagnetic tracking beam. Many electromagnetic beam sources provide a beam with a very small spot size. By providing the sheet of material with a scattering property, this small spot size can be converted to a larger spot size, more appropriate for detection, for instance via a charge coupled device array. Preferably in such arrangements, the spatially sensitive detector further comprises an imaging component for forming an image of the sheet of material and delivering the image to an image storage component such as the charge coupled device array.

In a particularly advantageous arrangement, in a scanning system according to an embodiment of the invention, an output of the terahertz radiation detector is connected to a modulator for modulating the electromagnetic tracking beam. This has the advantage that the tracking beam is made capable of creating an image signal with respect to the field of view being scanned using terahertz radiation.

Preferably in such as arrangement, the spatially sensitive detector is further sensitive to modulation of the electromagnetic tracking beam such that an output of the detector comprises an image of the field of view produced by scanned terahertz radiation.

Embodiments of the invention offer significant flexibility in the way an image can be obtained from a field of view scanned with terahertz radiation. Either an image can be created pixel by pixel, or an image can be created over the whole field of view and then the image information from several complete scans of the field of view can be integrated. This can be done for example by changing the refresh rate and/or sensitivity of the charge-coupled device array and/or by changing the characteristics of the steering element of the mobile component. The user can thus adjust the performance of the system to meet real-time requirements. For instance, the way an image is obtained can be adjusted to obtain relatively fine detail from a stationary object or to capture a usable image quickly from a moving object.

By integrating an image over several frames, the time taken to image a target can be reduced to the time taken to image a significant feature because it will become apparent during an imaging process as soon as that significant feature becomes clear. Further, it becomes possible to change one or more parameters of a scanning process before the process has finished. Hence if an interesting feature starts to emerge, one or more parameters might be optimised to show that feature more clearly or quickly. For instance, the scanning raster might be changed in area and/or pixel size so as to emphasise the relevant feature. Alternatively, a display driven by the pixel data might be tuned, for instance by altering the contrast, saturation or color range.

In the above description, features of apparatus in embodiments of the invention are generally described. However, the method steps provided by such apparatus are also inventive. For example, an embodiment of the invention comprises a method of scanning a field of view to provide a terahertz radiation input to at least one terahertz radiation detector, for use in imaging the field of view, which method comprises:
a) repeatedly scanning said field of view to obtain a plurality of outputs from the detector for the field of view; and
b) integrating said plurality of outputs to obtain an image of the field of view.

It is to be understood that any feature described in relation to any one embodiment may be used alone, or in combination with other features described, and may also be used in combination with one or more features of any other of the embodiments, or any combination of any other of the embodiments.

A terahertz imaging system will now be described as an embodiment of the present invention, by way of example only, with reference to the accompanying figures in which:

FIGS. 3a and 3b show a variation of the arrangement of FIG. 1 in which the tracking optical beam is parallel to the terahertz beam path but alongside rather than in-path, FIG. 3b showing cross-sectional detail with respect to FIG. 3a;

FIG. 5a shows a variation of the arrangement of FIG. 1 in which the tracking optical beam is reflected by a mirror at the back of a scanning minor;

FIG. 5b shows a variation of the arrangement of FIG. 1 in which terahertz radiation from a field of view is scanned across an array of terahertz detectors rather than a single detector;

FIG. 6 shows a variation of the tracking arrangement of FIG. 1 in which the tracking optical beam is steered by a prism on the back of a scanning mirror;

FIG. 10 shows a schematic plan view of a translucent screen used to receive light from a scanning mirror such as that shown in FIG. 5a;

FIG. 13 shows a front elevation of a resonant scanning mirror for use in an arrangement as shown in FIG. 5a.

It should be noted that none of the figures is drawn to scale. All of the figures are schematic only. Where the same parts are indicated in different figures, the same reference numerals have been used.

Figure 1:
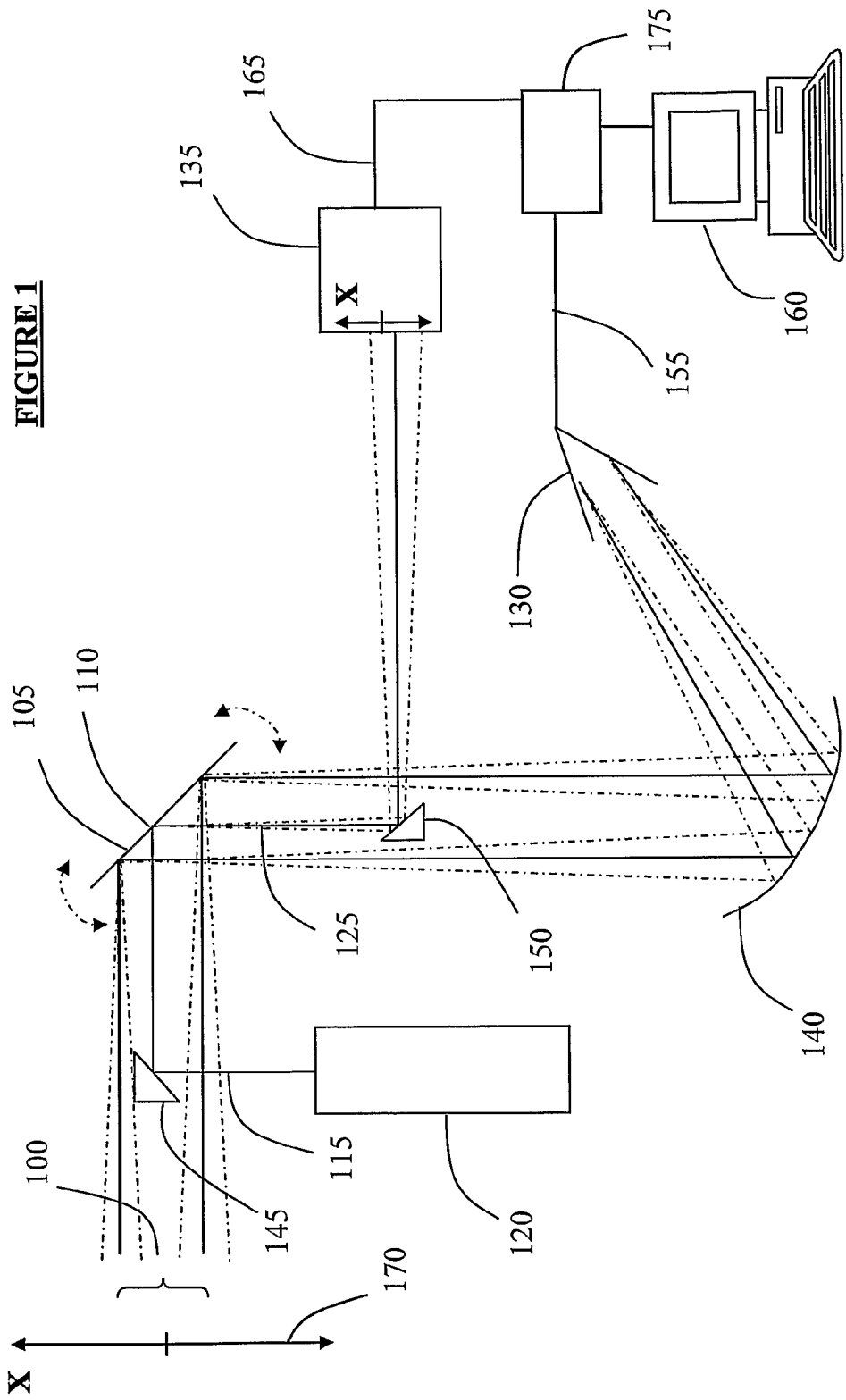
FIG. 1 shows a schematic plan view of a first example of the terahertz imaging system using an in-path optical tracking beam and charge-coupled device ("CCD") array to track scanning behavior of the system.

Referring to FIG. 1, the basis of a terahertz imaging system which can be used in embodiments of the invention comprises a scanning device 105, for instance a mirror as might be used in an optical imaging system, and a focussing device 140 for focussing incoming terahertz radiation 100 onto a horn antenna 130. (The incoming terahertz radiation 100 is collimated in known manner, using correcting optics not shown in the figures.) The horn antenna 130 is of known type and converts the terahertz radiation into an electrical output modulated by the intensity of the incoming terahertz radiation 100 at any one scan position. The focussing device 140 can again be a component as might be used in an optical system, such as a concave mirror as shown.

Horn and planar antennas are well known directive components used for coupling the THz signal propagating in free space to a waveguiding structure or transmission line circuit. A horn antenna typically consists of a tapered transition, opening out from a waveguide to an aperture larger than the waveguide. The size of the aperture largely governs how directive the antenna is. For planar transmission line circuitry there are a number of equivalent planar antenna coupling structures, including for example the vivaldi antenna.

The scanning device 105 here comprises a resonant scanning mirror (RSM), known for use in scanning the position of an optical laser beam at high speed, typically 50-1000 Hz. The RSM 105 consists of a plane mirror that is actuated about a common rotational axis 110 via an electronically driven solenoid.

Importantly, there is also an optical source 120 providing a collimated beam 115 which is reflected onto the RSM 105 by a reflector 145 such as a mirror or prism. The beam 115 is then reflected by the RSM 105 onto a second mirror or prism 150 which sends it to a CCD array 135. In this arrangement, the collimated optical beam 115 is brought into the path of the terahertz radiation beam in the region of the RSM 105. The two reflectors 145, 150 are also in the path of the terahertz radiation beam. To avoid degradation of the terahertz imaging, the reflectors 145, 150 are made out of a material such as Mylar which is transparent to terahertz radiation.

An important feature is that the optical beam 115 hits the RSM 105 at the rotational axis 110. Otherwise, changes in path length between the RSM 105 and the reflector 145 directing the optical beam 115 onto the RSM 105, as the RSM 105 moves, will introduce complication.

Thus the terahertz radiation 100 and the collimated optical beam 115 follow substantially the same path in the region of the RSM 105. However, the scanning provided by the RSM 105 is doing a different job for the terahertz radiation 100 and the collimated optical beam 115. The terahertz radiation 100 is brought to a fixed point for detection, at the horn antenna 130. Where the terahertz radiation 100 is concerned, it is the field of view 170 which is scanned. Conversely, the collimated optical beam 115 comes from a fixed source 120 and is then scanned across the detector, in this case the CCD array 135. The scanning of the optical beam across the CCD array 135 nevertheless replicates the scanning of the terahertz radiation 100 across the field of view 170.

The terahertz radiation 100 incoming to the system from the field of view can be either emitted or reflected by a target in the field of view. Levels of terahertz radiation emitted by a target may be too low in some circumstances. In this case, a system according to an embodiment of the invention may further include a terahertz beam source to scan the field of view 170. Conveniently, this might be provided by the existing horn antenna 130 and a suitable arrangement is further described below with reference to FIG. 11. Then the RSM 105 can be used to scan a terahertz beam emitted by the horn antenna 130 over a target and simultaneously, in the other path direction, to collect the reflected terahertz beam 100 and to scan the optical beam 115 over the CCD array 135.

Figure 13:
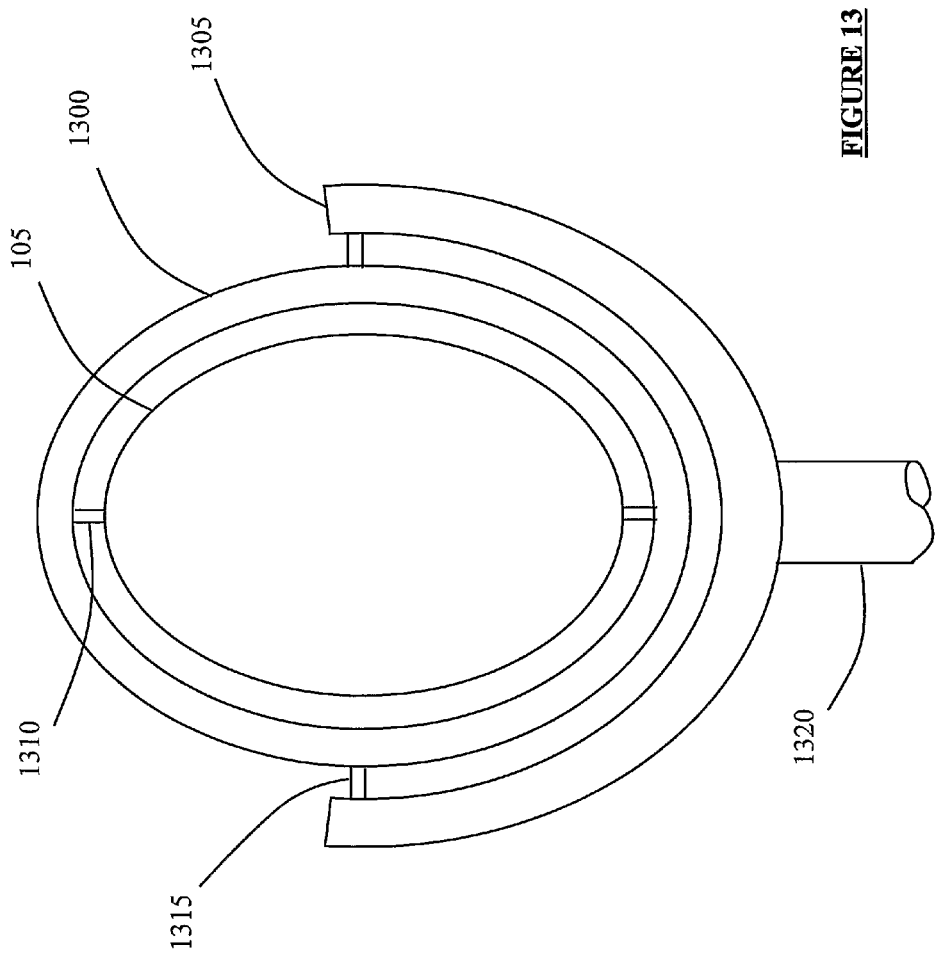

Referring to FIG. 13, as mentioned above, the RSM 105 scans about a vertical axis at 50-1000 Hz. The RSM 105 itself comprises a film stretched over a frame (further described below with reference to FIG. 9) and this RSM frame has supports 1310 at top and bottom, supporting it in a second, oval frame 1300. The oval frame 1300 is then itself supported in a further, generally "U"-shaped frame 1305 by horizontal supports 1315. The oval frame 1300 rotates about a horizontal axis through its supports 1315 at the slower, frame refresh rate of 5-50 FPS suitable for a liquid crystal display (LCD) device. Thus individual pixel data is refreshed by high speed scanning, at 50-1000 Hz, but the frame refresh rate is the lower 5-50 FPS.

RSMs are supplied by various manufacturers, including for example the US-based company Electro-Optical Products Corporation.

Referring again to FIG. 1, the optical source 120 comprises a laser such as a semiconductor Fabry-Perot laser which can produce a beam 115 of small cross section so as to produce a small spot of light on the CCD array 135. If the optical beam 115 is large or diffuse, either more complex signal processing may have to be used or the resolution may be relatively poor.

The output 165 from the CCD array 135 can be stored, transmitted elsewhere or used via image processing software 175, in known manner, to feed a liquid crystal display (LCD) device 160. The output 155 of the terahertz detector 130 can also be connected to the image processing software 175 and used to modulate the input to the LCD device 160 to adjust the intensity and/or color of the LCD pixels (depending on the image display required by the operator). Because the field of view 170 of the THz detector 130 is scanned synchronously with the CCD array 135 by the scanned optical beam 125, there is an absolute and real-time link between a point in the terahertz field of view being scanned by the RSM 105 at any one moment and the level or color of a pixel displayed on the LCD screen. In this way, any raster pattern including random patterns can be displayed with no computational requirement. This principle then allows the scanning of the terahertz field of view at very high speed because it is no longer necessary to have independent information about the scanning behavior of the RSM 105. It is no longer necessary to use relatively slow scanning mechanisms such as those using servo motors simply in order to have data regarding the scanning behavior.

A simple summing and integration routine can be applied to the CCD device 135 which will allow real time imaging of the entire field of view, frame by frame. The CCD device 135 will continue to build an image over a period set by its refresh rate. The CCD refresh rate can be set to achieve different objects. For example, one could set the CCD refresh rate low so as to allow a weak image of a relatively stationary subject to be naturally integrated by the CCD device as each scanned frame of the RSM overlays the next. For example, the RSM could scan over the image field fives time before the CCD is refreshed. In this way the multiple images produced by the fast scanner, each of the entire field of view, can be summed to improve image quality via integration. Alternatively, for a strong image of a rapidly moving subject the CCD image refresh rate can be increased to provide faster image capture to resolve movement. Thus by setting the CCD refresh rate an operator can adjust resolution and/or clarity appropriately for their application depending on the strength of the image and/ or the speed of movement of the subject. A further option may be to adjust pixel size at the LCD device 160 in relation to the detectors of the CCD array 135.

Figure 9:
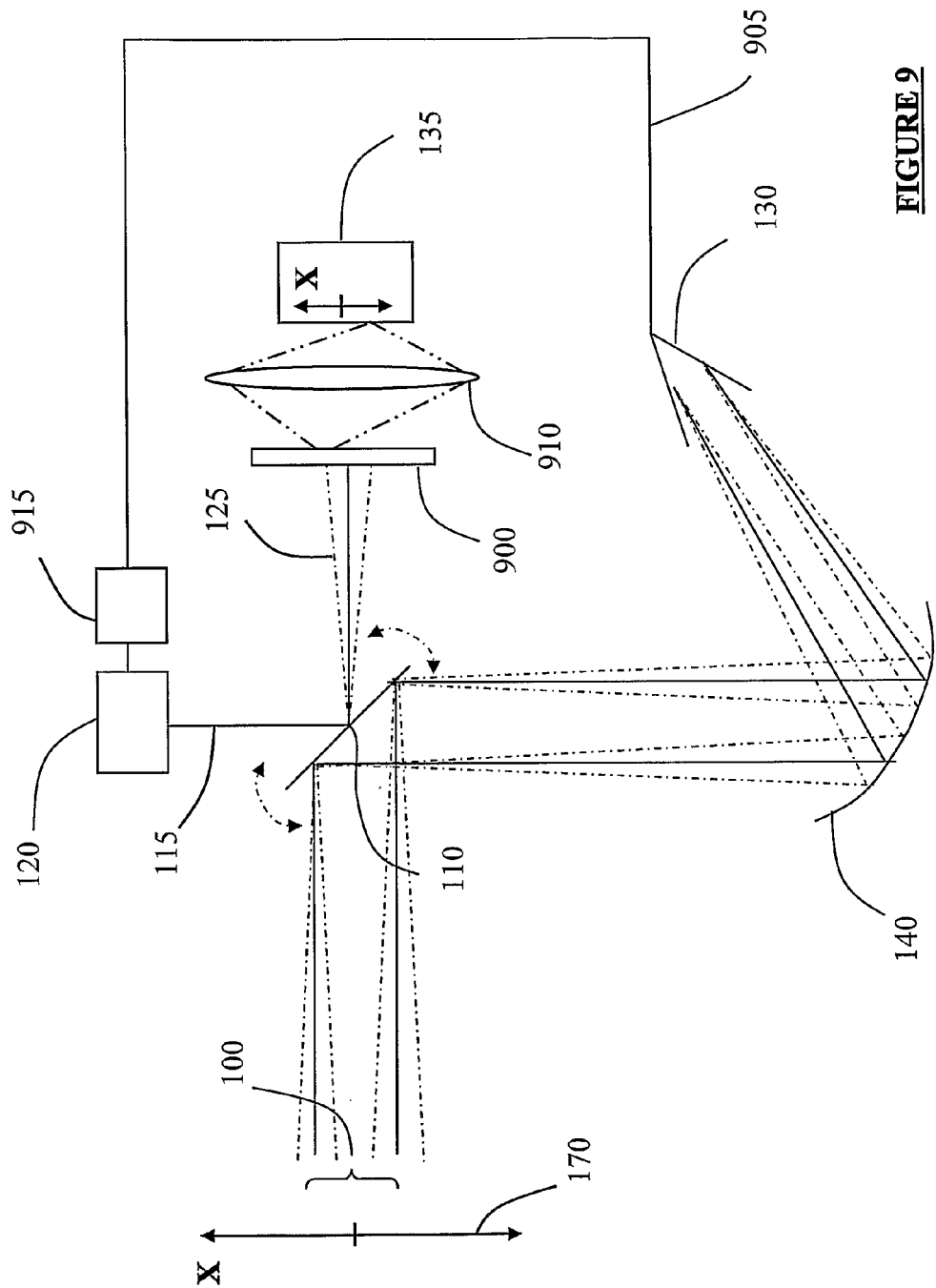
FIG. 9 shows a schematic plan view of an arrangement based on that of FIG. 5a in which the output of a terahertz radiation detector is used to modulate the source of the tracking optical beam to produce image data at a CCD array.

As mentioned above, a factor affecting resolution of the image is the relationship between the spot size of the optical beam 115 and the size of the detectors of the CCD array 135. Referring to FIG. 9, this can be adjusted by using a translucent screen 900 between the scanned optical beam 115 and the CCD array 135, together with imaging optics such as a lens 910 for capturing and reducing the spot size from the screen 900 to the CCD array 135. (The uses and advantages of the translucent screen 900 are further discussed below.)

ALTERNATIVE EMBODIMENTS

Figure 2:
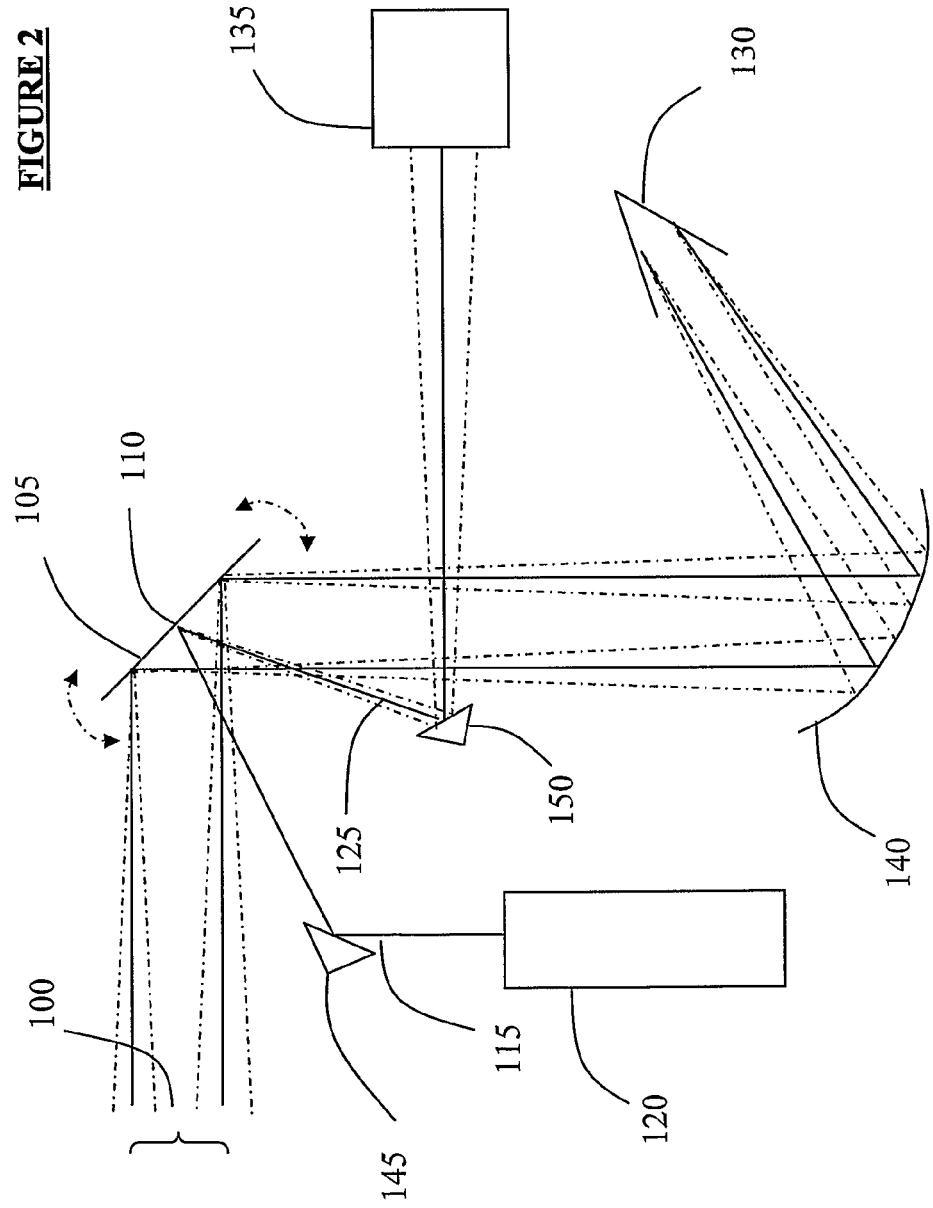
FIG. 2 shows a variation of the arrangement of FIG. 1 in which the tracking optical beam is non-parallel to the terahertz beam path.

Referring to FIG. 2, it is not essential that the optical beam 115 used to track the scanning motion of the RSM 105 follows the path of the terahertz radiation 100 at the RSM 105. In an alternative arrangement, the reflectors 145, 150 for directing the optical beam 115 are placed outside the terahertz radiation beam path and direct the optical beam 115 onto the RSM 105 at a more acute angle than the path of the teraHertz radiation. This still generates a scanned optical beam at the CCD array 135 which is synchronous with the scanning of the terahertz field of view.

Referring to FIG. 3, in a variation of the FIG. 2 arrangement, it is also possible to increase the dimension of the RSM 105 so that the optical beam 115 can be directed parallel to the terahertz radiation beam 100 at the RSM 105 but alongside it instead of within it. Such an arrangement preserves the direct relationship between the scanning of the terahertz radiation field of view and the optically scanned area at the CCD array 135.

FIG. 3a shows an arrangement similar to that of FIG. 1 but the reflectors 145, 150 for guiding the optical beam 115 are in fact above the path of the terahertz radiation 100. This can be seen in FIG. 3b which shows the cross-section A-A indicated in FIG. 3a, viewed in the direction of the arrows. In FIG. 3b, it can be seen that the optical beam 115 hits the RSM 105 on the vertical axis of rotation 110 but spaced above the footprint of the terahertz radiation 100 on the RSM 105. The optical beam 115 is deflected sideways, as shown, to the next reflector 150, in parallel with but outside the path of the terahertz radiation 100.

Figure 4B:
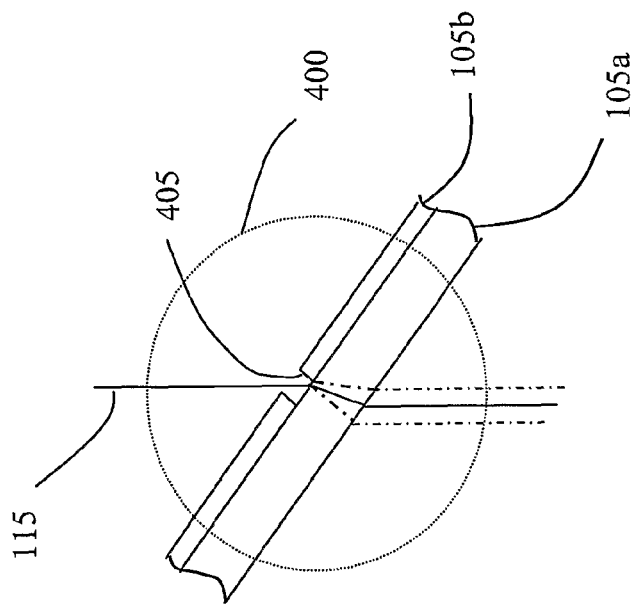
FIGS. 4a and 4b show a variation of the tracking arrangement of FIG. 1 in which the tracking optical beam enters the path of the terahertz radiation through a hole from behind a scanning mirror, FIG. 4b showing the path of the tracking optical beam of FIG. 4a in more detail at the point where it is steered by the scanning mirror.
Figure 4A:
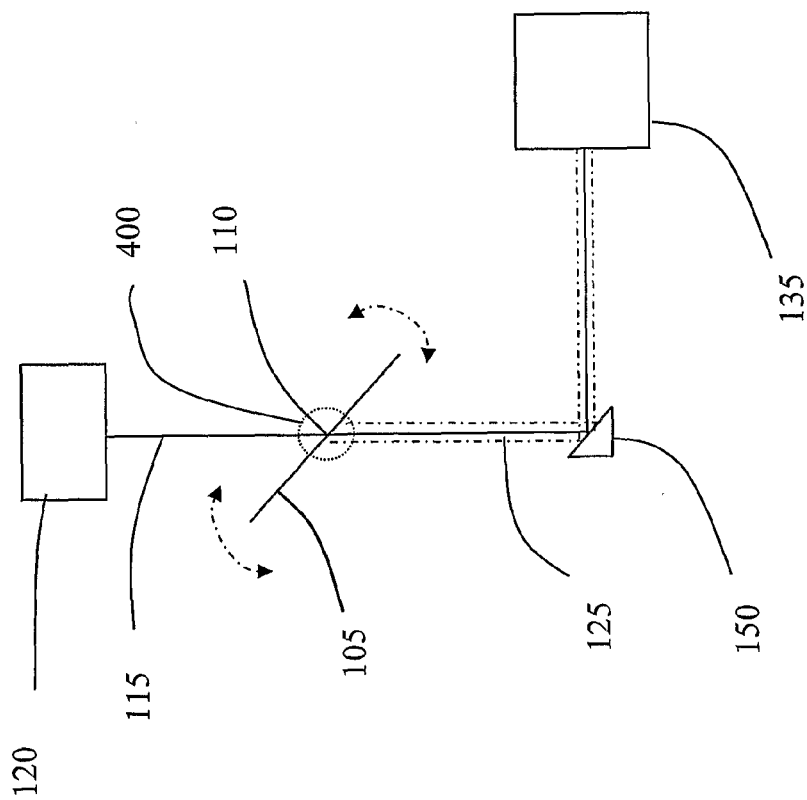

Referring to FIG. 4, where a compact system is required it is an option to introduce the optical beam 115 at the back of the RSM 105. FIG. 4a shows an arrangement in which the optical beam 115 passes through the RSM 105 at a point on the rotational axis 110. This may be in-beam as shown in FIG. 1, or parallel to it as shown in FIG. 3. (FIG. 4 excludes the path of the terahertz radiation 100 for the purpose of clarity and thus shows just an optical beam arrangement.)

The transition point at which the optical beam 115 passes through the RSM 105 is indicated by a circle 400 in FIG. 4a and enlarged in FIG. 4b. In FIG. 4b, it can be seen that the RSM 105 has two layers, a backing layer 105b which reflects terahertz radiation and a front layer 105a which is transparent to both the terahertz radiation beam 100 and the optical beam 115. The optical beam 115 passes through a hole in the backing layer 105b and is steered by refraction in the material of the front layer 105a of the RSM 105 as the RSM 105 rotates.

The refraction can have a secondary effect. If the linewidth of the frequency spectrum of the optical beam 115 is broad, the refraction will tend to spread the beam 115 as well as steering it. FIGS. 4a and 4b show the optical beam 115 at just one position of the RSM 105 and indicate the spreading effect of the refractive front layer 105a. There are several ways to deal with the spreading of the refracted beam 125, should it pose a problem. These are to use an optical beam 115 which has a narrow linewidth, to use a CCD array 135 which is only sensitive to a narrow frequency band in the refracted beam 125, to insert a filter or to use imaging optics to reduce the spot size of the refracted beam 125 on the CCD array 135.

Referring to FIG. 5a, in another variation, the optical beam 115 can simply be reflected at a position on the rotational axis 110 at the back of the RSM 105. This produces the same scanning motion as the front and equally well produces scanning of the optical beam 115 over the CCD array 135.

Referring to FIG. 5b, a strength of embodiments of the present invention is that not just one terahertz detector 130 but a whole array of terahertz detectors 130 can be scanned relative to a field of view without the array of detectors 130 having to be moved. The scanning position of an RSM 105 for example, relative to each of the detectors 130 of the array, can be determined from the position of the one optical beam 115 at the RSM 105.

It might be noted that, in any of the embodiments here described, the RSM 105 might move about more than one axis 110. If this is the case, in an arrangement such as that of FIG. 4 where the optical beam 115 passes through a hole 405 in the RSM 105, it is important that all the axes about which the RSM 105 rotates in use pass through the hole 405. Otherwise, movement of the RSM 105 will almost inevitably tilt the hole 405 away from the incoming optical beam 115. In other arrangements, multiple axes of rotation may meet at a point on the RSM 105 in which case the optical beam 115 is preferably steered at this point and should therefore be directed to this point. If the optical beam 115 is not directed at a point where more than one axis of rotation 110 meet, then changes in path length are likely to make the relationship between the scanned optical beam 115 and the scanned terahertz field of view either complex or impractical.

Referring to FIG. 6a, instead of using reflection, a prism 600 can be added to the rear of the RSM 105 and used with a broad spectrum or multicolor incident optical beam 115. As the beam 115 passes through the prism 600, its component wavelengths are differently refracted to provide a broadened output 125 of different colors. In FIG. 6a, a refracted beam 125a, 125b, 125c is shown for each of three different scanning positions of the RSM 105.

FIG. 6b shows a front elevation of the face of the CCD array 135 of FIG. 6a, turned through 90° with respect to the view shown in FIG. 6a. The extended footprint of the refracted broad spectrum beam 125a, 125b, 125c on the face of the CCD array 135 is shown for each of the three different scanning positions. This extended footprint can be used to advantage. By using either an optical filter (not shown) with only a small number, for example two, narrow passbands, or a CCD array 135 which is sensitive to only a small number, for example two, narrow bands of the broadened output, it is possible to achieve greater spatial positioning accuracy. This is done by averaging positioning data for each of the narrow (pass)bands within each footprint. For example, as indicated by circles in FIG. 6b, positioning data can be obtained at the CCD array 135 in respect of light refracted to each end of the footprint of the refracted beam 125a, 125b, 125c. This data is then averaged.

Figure 7:
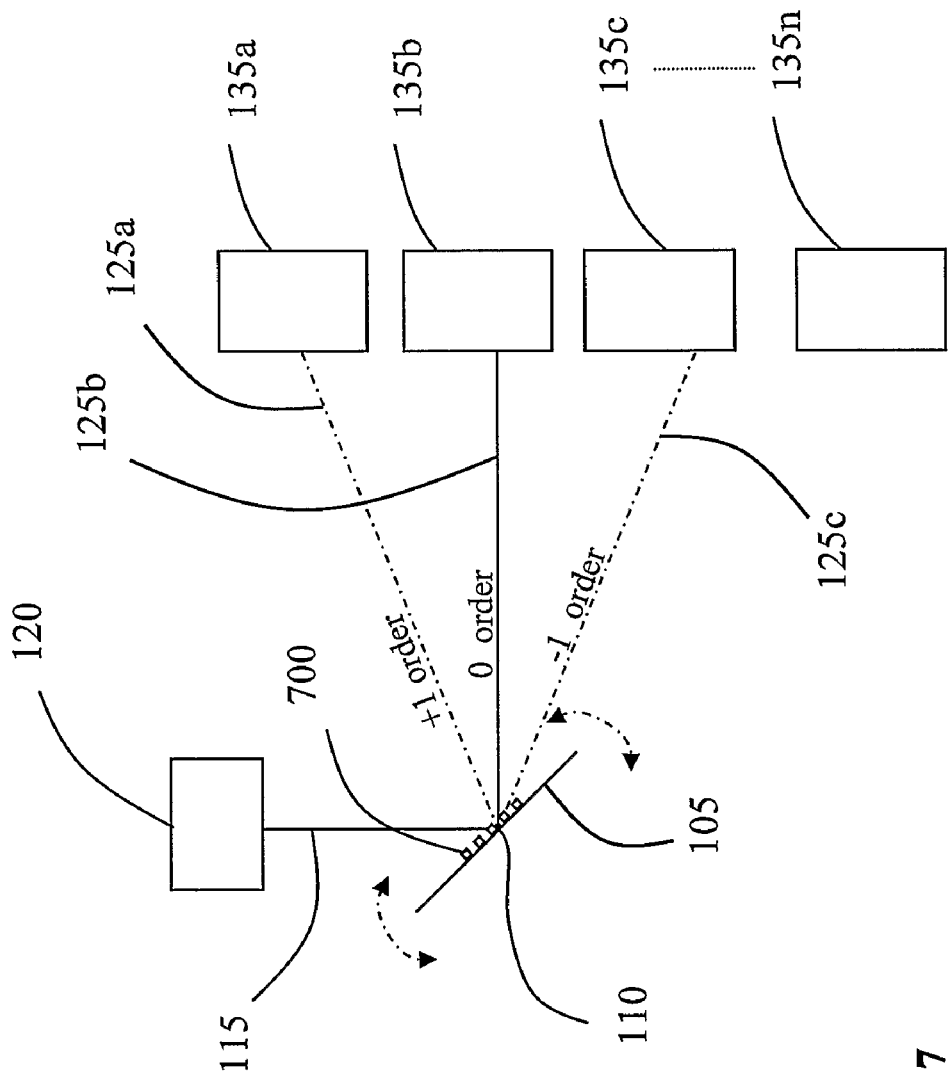
FIG. 7 shows a variation of the tracking arrangement of FIG. 1 in which the tracking optical beam is diffracted by a grating on the back of a scanning mirror.

Referring to FIG. 7, instead of the prism 600, a diffraction grating 700 can be added to the back of the RSM 105 such that an incident optical beam 115 is diffracted rather than refracted. Diffraction can produce more than one order of diffraction, creating a set of diffracted beams 125a, 125b, 125c which are spatially separated. These are then each scanned onto a different respective CCD detector array 135a . . . 135n. By using the combined out put from the different CCD arrays 135a . . . 135n, greater positional accuracy can be achieved.

Figure 8:
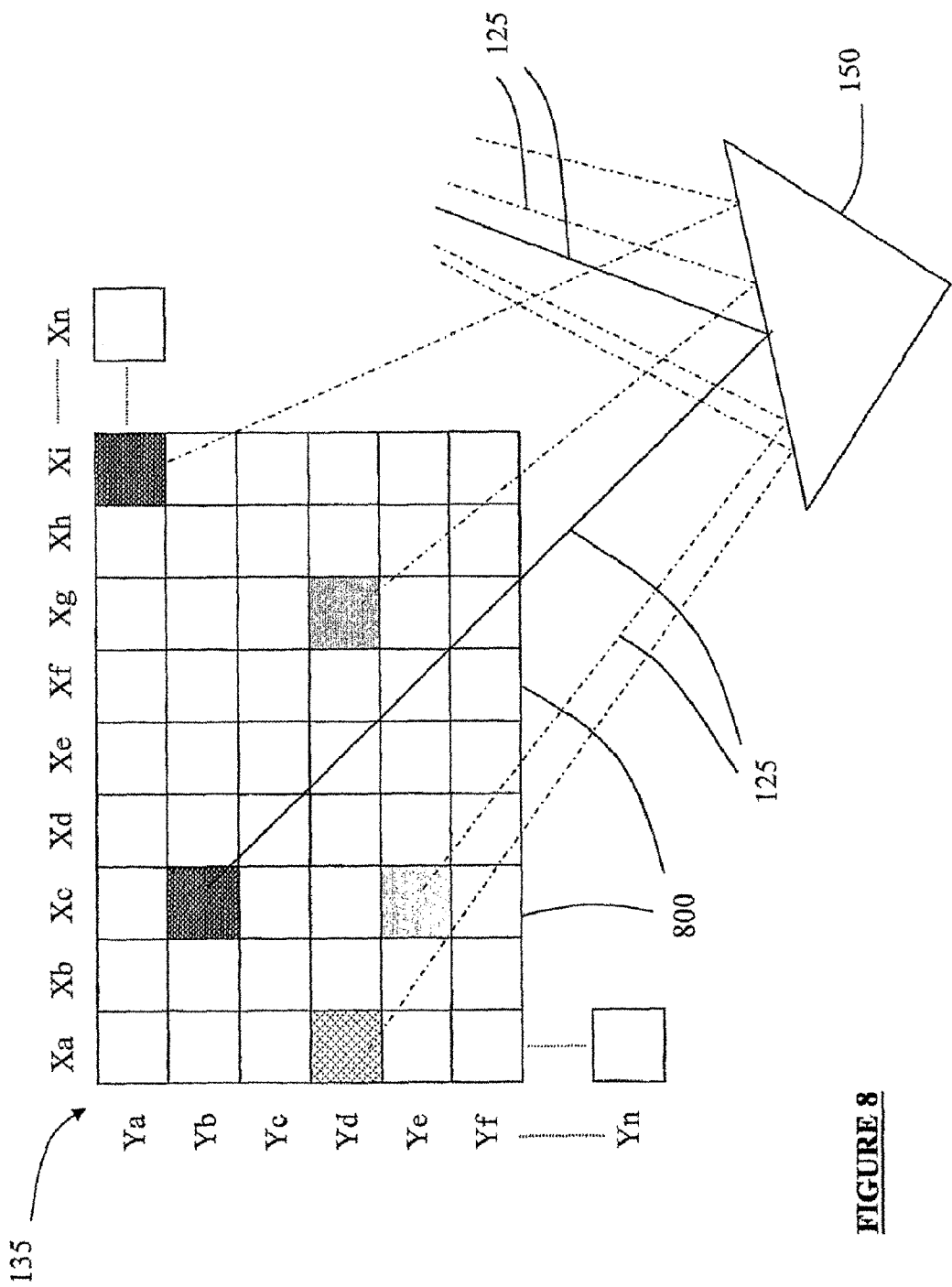
FIG. 8 shows schematically the relationship between the tracking optical beam and a CCD array for detecting a current scanning position.

Referring to FIG. 8, the relationship between the scanned optical beam 125 and the CCD array 135 is as follows.

As the RSM 105 moves about, the incident optical beam 115 (not shown in FIG. 8) becomes a scanned beam 125, scanned over the reflecting surface of the second reflector 150 and thus over the CCD array 135. FIG. 8 shows a compilation of views of the scanned beam 125 reaching the CCD array 135 at several different moments in a scanning operation. (It will be understood that FIG. 8 is schematic only, the scanned beam 125 in many arrangements having a distributed footprint on the CCD array 135.)

The CCD array 135 is a known type of device comprising an integrated-circuit chip that contains an array of capacitors that store charge in response to light. The charge accumulates and can be read for each capacitor, indicating a distribution of light over the array. Although other devices could be used, such as photodetectors, the CCD array is particularly sensitive for measurement of low light levels. If there is only one optical beam 125 being scanned over the CCD array 135, the array 135 will thus generate a set of values related in time and space to the position of the scanned optical beam 125 and thus to the behavior of the RSM 105.

Each capacitor of the CCD array 135 can be viewed as a pixel 800 in relation to an image. Each pixel 800 in the array 135 has an associated identifier ("ID") and the CCD array 135 can be read to give the ID of the pixel producing a value at any one instant.

It would be possible to take the time and pixel ID data and map it to the output of the horn antenna 130 in order to translate the sequential output of the horn antenna 130 to an image signal. However, as described above with reference to FIG. 1, it is a simple solution to feed both signals, the pixel ID of the CCD array 135 and the output of the horn antenna 130, simultaneously to a display module such as a LCD device 160. The pixel ID from the output of the CCD array 135 is used to select one or more pixels of the LCD device 160 while the output of the horn antenna 130 is used to modulate the intensity or color of each selected pixel(s). Thus an image can be created at the LCD device 160 which represents the intensity distribution of the incoming, scanned, terahertz radiation 100.

Modulation of the pixels as described above to create a real-time image at the LCD device 160 would still be possible where the single detector 130 is replaced by an array of detectors 130 as shown in FIG. 5b. However, this would of course require a degree of signal processing and perhaps integration over more than one full scan in order to relate the position of responding detectors 130 in the array to the pixels of the CCD array 135.

Referring to FIG. 9, in a variation of the arrangement of FIG. 5a, the output of the horn antenna 130 is used instead to modulate the light source 120 for the optical beam 115. The optical beam 115 is again scanned synchronously with the terahertz radiation 100 by the RSM 105 and input to the CCD array 135, this time via a translucent screen 900. This time the CCD array 135 directly forms an image signal, representing the image formed by the terahertz radiation 100. This signal can be stored or sent over a network and used later to run a LCD device 160 or indeed another imaging system. The requirement for real-time delivery of a signal to the LCD device 160, to be synchronously modulated by the output of the horn antenna 130, is removed.

Working Embodiment

Referring to FIG. 9, an example of a working system is as follows.

FIG. 9 shows an arrangement similar to that of FIG. 5a, in plan view. An RSM 105 and a concave optical mirror 140 are positioned to construct a scanned field of view 170 for a terahertz radiation detector 130, in this case sensitive to a frequency of 0.3 THz. An optical beam 115 from a light source 120, such as a white light optical LED (Light Emitting Diode), is simultaneously incident on a reflective area on the back of the RSM 105, this producing an optical beam 125 scanned concurrently with the field of view 170. The scanned optical beam 125 in this case is scanned across an optical projection plane on a translucent screen 900. Thus, as shown, the output from the light source 120 is imaged onto the translucent screen 900 at a position mapped to the scanning position of the detector 130 in the field of view 170. Using appropriate coupling optics, such as a lens 910, the image from the translucent screen 900 is then projected onto a correspondingly mapped position on the CCD 135.

The CCD 135 can alternatively be replaced by a CMOS (Complementary Metal Oxide Semiconductor) array in which integration of the light signal is carried out digitally on chip.

In a particularly efficient arrangement, in this embodiment the instantaneous amplitude of the output of the THz detector 130 is used via control electronics 915 to modulate the amplitude of the light source 120. This means that an image detected in terahertz radiation by the detector 130 in the scanned field of view 170 directly controls an optical image created by the scanned optical beam 125 on the translucent screen and transferred via the lens 910 to the CCD array 135. Hence as the RSM 105 is driven to scan the terahertz detector 130 over the field of view 170, a corresponding optical image is created simultaneously at the CCD array in the visible light regime.

The output of the THz detector 130 is in the form of a varying voltage signal and the control electronics 915 are necessary to convert the voltage amplitude modulation in the output of the THz detector 130 to an input suitable to modulate the amplitude of the light source 120.

Figure 14:
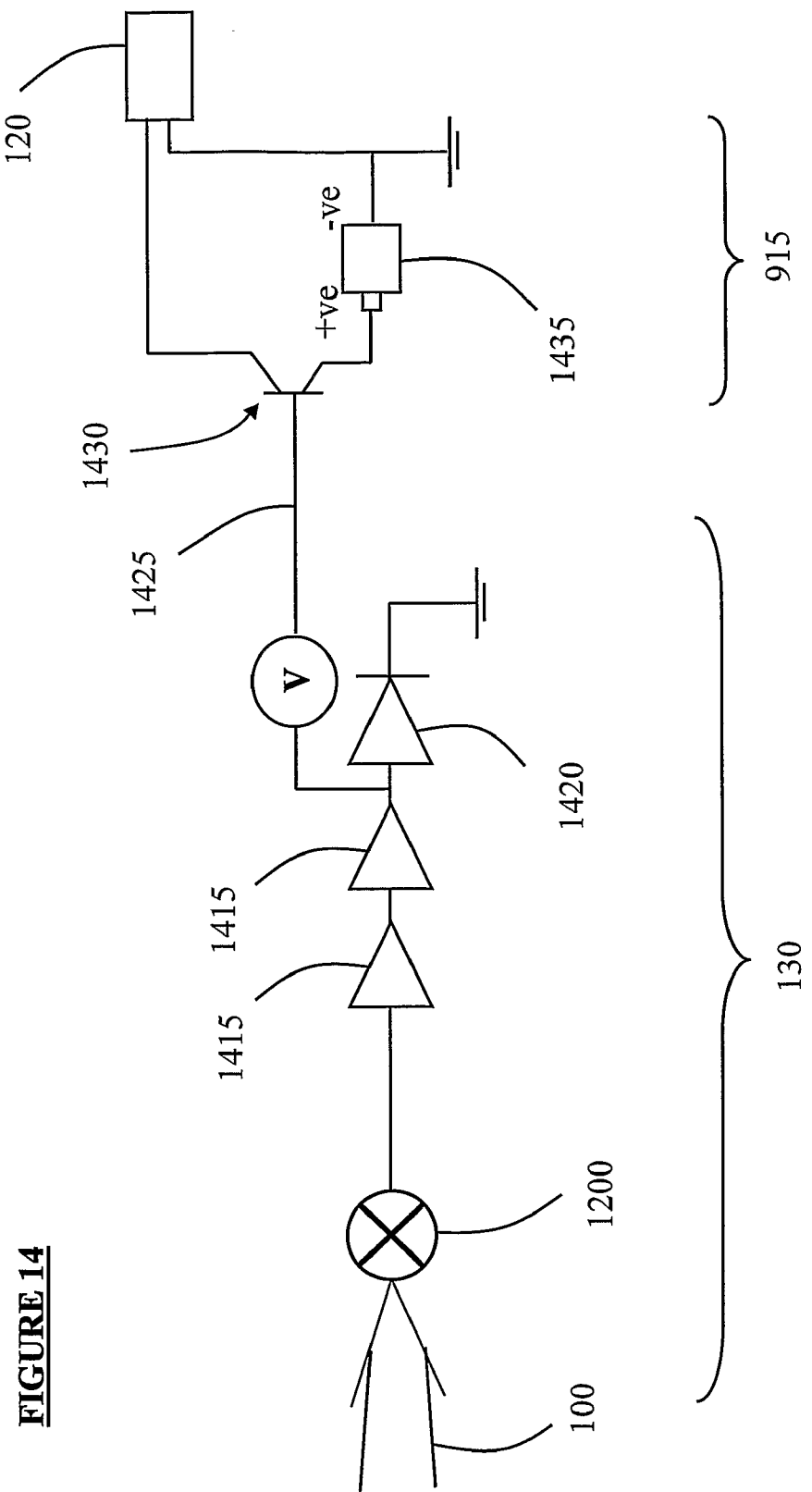
FIG. 14 shows a schematic diagram of circuitry for use in implementing the arrangement for modulating an optical source as shown in FIG. 9.

Referring to FIG. 14, for a THz detector 130 based primarily on a heterodyne mixer 1200, the output voltage "V" of the detector 130 is formed by rectifying the low frequency (0.1-50 GHz) Intermediate Frequency (IF) from the mixer 1200. To do this, the output from the mixer 1200 is amplified by two amplifiers 1415 and then rectified using a Schottky diode 1420 to create a DC (direct current) voltage output 1425. The LED control electronics 915 are then necessary to convert the voltage amplitude modulation in this DC voltage output 1425 of the THz detector 130 to a driving bias voltage/current suitable to modulate the amplitude of the light source 120.

If the light source 120 comprises a LED, the control electronics 915 will principally perform the role of transforming the DC voltage output 1425 of the detector 130 to a gain control signal suitable for the LED. In practice for an LED the modulated output voltage 1425 from the THz detector 130 would be fed into the gate of a field effect transistor 1430 that, together with a battery/voltage source 1435, is used to control the bias current of the LED.

Dimensional requirements in a system such as that shown in FIG. 9 are as follows.

A requirement for a system might be for example to achieve a pixel size of 2×2 cm in a THz field of view 170 having a maximum dimension of one meter, positioned about three metermeters from the RSM 105. This gives a good working arrangement for example for imaging a human torso. Pixel size is determined in known manner by the THz optics design which defines the incoming beam width and also by the nature of the signal processing applied to terahertz radiation detected at the detector 130 in the light of the scanning behavior of the RSM 105. To achieve this pixel size of 2×2 cm in the field of view 170 at a distance of 3 m from the RSM 105, the final aperture of the system (that is, the instantaneous beam size at the RSM 105 which is collected to the THz detector 130) would need to be approximately 100 mm in diameter. The RSM 105 then needs to be 110 mm in diameter to accommodate the final aperture when tilted during scanning. In order to map out a vertical image size in the THz field of view 170 having the dimensions 0.6 m horizontal by 1 m vertical (typical size required for the imaging of a human torso) at a distance of 3 m from the RSM 105, the RSM 105 needs to be scanned through an angle from +9.5 to −9.5 degrees in a vertical plane and from +5.7 to −5.7 degrees in a horizontal plane.

In a typical application the RSM 105 might consist of a lightweight, thin (0.02 mm thick), metallised plastic film (such as Mylar), pulled tight over a supporting frame. In the embodiment described in FIG. 9, the metallisation would need to be thick enough to be completely reflective in both the visible and THz wavelength regime. A thickness of 0.002 mm of aluminium would be more than sufficient. In addition, the metallisation would be on the "back" of the film providing the RSM 105 such that the tracking optical beam 115 is not passed through the plastic thereby eliminating refraction effects.

The tracking optical beam 115 reflected at the back of the RSM 105 would necessarily be scanned over the same angles from +9.5 to −9.5 degrees in the vertical plane and from +5.7 to −5.7 degrees in the horizontal plane. At a distance of 100 mm from the centre of the RSM 105 this would map out an image size of 32 mm in the vertical plane and 20 mm in the horizontal plane on the translucent screen 900. The imaging optics 910 are then preferably designed to produce an image of the translucent screen 900 that would fill the CCD array 135 which would be typically 10 mm×6 mm in dimension. The resulting optical beam pixel sizes for this system would be approximately 0.7 mm on the translucent screen 900 and 0.22 mm on the CCD array 135.

It is here that the usefulness of the translucent screen 900 used in conjunction with imaging optics 910 becomes apparent. By using the screen 900, the distance between the RSM 105 and the CCD array 135 becomes a function of the design of the optical reduction/magnification optics 910 and is largely independent of the THz imaging distance and scanner angle. Also, the spot size requirement for the light source 120 can be tailored for each application. If the screen 900 were not implemented, then a relatively small spot size has to be used and the scanning has to be done such as to map the scanned optical beam 125 to the relatively small dimensions of the CCD array 135.

The semi-opaque screen 900 could be manufactured in a number of ways. One method would be to roughen the surface of a thin (20 micron thick) transparent Mylar film using a process such as sandblasting. The aim of the surface roughening is to scatter the beam 125 received from the RSM 105 so as to form a second extended light source at the screen 900 which can then be re-imaged onto the CCD array 135.

In a further variation, instead of using the CCD array 135 to generate a modulated electrical signal output representing an image on the screen 900, it would be possible to capture the image directly from the screen 900 using a camera with an appropriate shutter speed. In practice, the image can also be seen directly on the screen 900 by the human eye.

In order to speed up the image capture time it may be desirable to use more than one THz detector 130 configured in an array of detectors 130. In this instance, each THz detector 130 is used to drive its own visible light source 120 in a corresponding array of light sources 120.

There are two possible sources of distortion of the image at the CCD array 135. Firstly, referring to FIG. 10, even where there is only one light source 120, the RSM 105 will illuminate a larger area of the translucent screen 900 when tilted towards the edges of the screen 900. That is, the footprint 1000a of the scanned optical beam 125 is larger towards the edge of the screen 900 than the footprint 1000b of the scanned optical beam 125 towards the centre of the screen 900. When more than one light source 120 is used, a second source of distortion arises if the light sources are directed at the RSM 105 from different angles. This may be the case for instance where the incoming optical beams 115 have to pass through a hole in the RSM 105 or have to be steered by a relatively small prism 600 or grating 700 on the back of the RSM 105. Again, the footprint of a scanned beam 125 towards the edge of the screen 900 will tend to be larger than at the centre of the screen 900.

Figure 10:
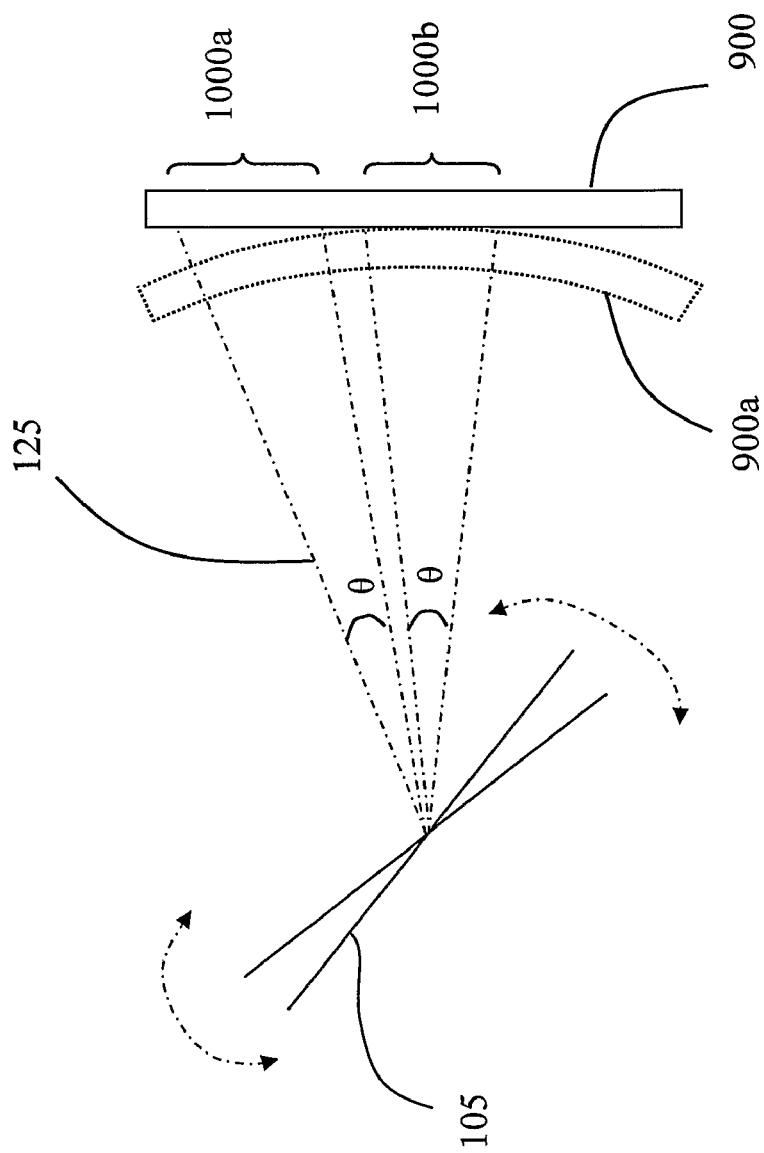

Referring to FIG. 10, such distortion can be reduced or alleviated by using a curved screen 900a, indicated in dotted outline in FIG. 10. In order to be successfully implemented however, the depth of field of the optical reduction/magnification optics 910 (shown in FIG. 9) should be sufficient to stay in focus over the whole surface of the curved translucent screen 900a. Additional correcting optics such as a concave lens to pick up light from the curved screen 900a may further improve the situation.

Figure 11:
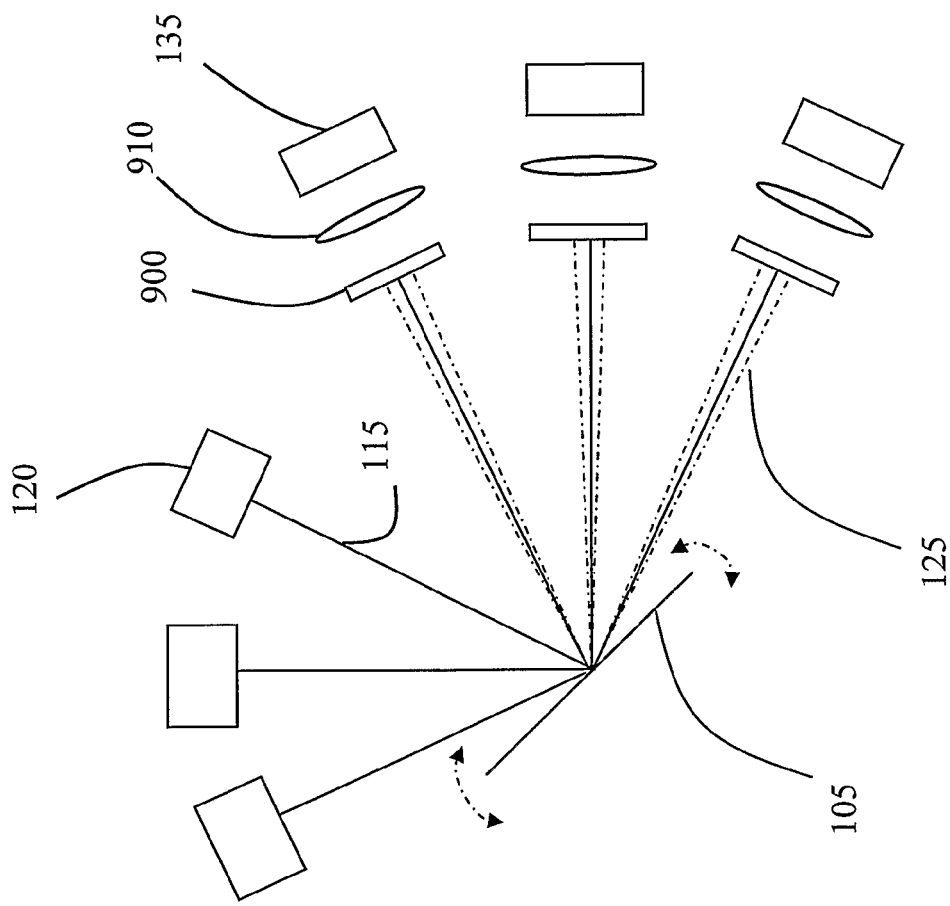
FIG. 11 shows a schematic plan view of a variation of the arrangement shown in FIG. 5a, in which multiple tracking optical beams are used.

Referring to FIG. 11, the distortion due to use of multiple optical sources 120 can also be alleviated by using multiple THz detectors 130 and multiple optical sources 120. In this embodiment, the multiple optical sources 120 each have their own translucent screen 900 and CCD array 135 arranged at appropriate angles to the RSM 105.

Another source of aberration in the image integrated at the CCD array 135 is that most RSMs 105 operate in a sinusoidal manner which results in a longer time being spent at the edges of the image compared with the centre of the image. Consequently more light will be apparent at the edges of the CCD (or CMOS) array 135. One way to correct for this effect is to incorporate a varying intensity mask in front of the array 135 which will flatten the light intensity over the field of view.

It is also possible to use image processing software to alleviate at least some potential distortions and aberrations which may be inherent in a system according to an embodiment of the invention. This could for example operate on the output of the CCD array 135 prior to display or other processing of the image signal.

Figure 12:
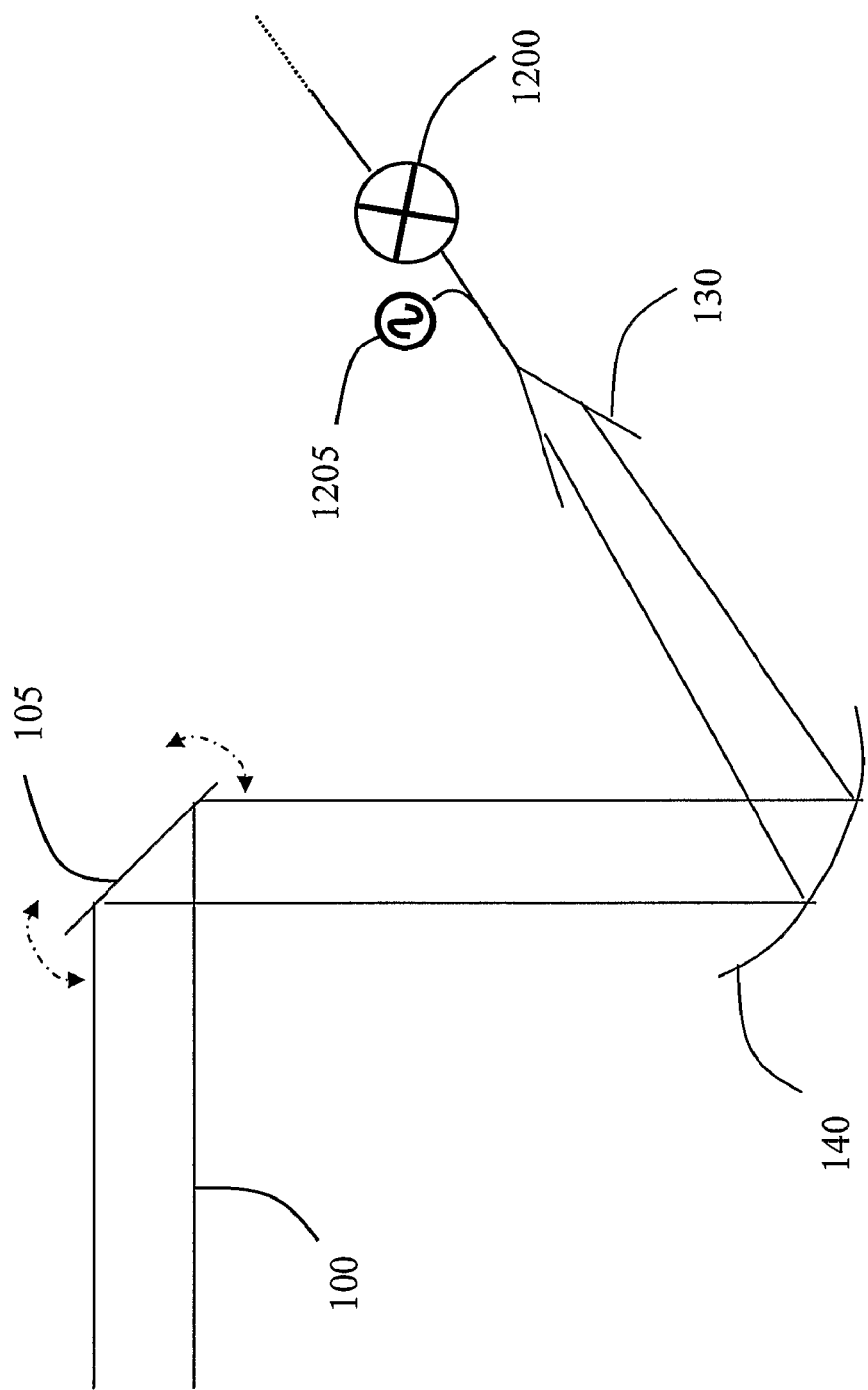
FIG. 12 shows a schematic plan view of a terahertz detector arranged to act also as a terahertz source in illuminating a field of view.

Referring to FIG. 12, in all of the above embodiments it is possible to illuminate the THz field of view 170 with terahertz radiation 100. This can be done by using the same antenna(s) 130 to generate terahertz radiation 100 as to detect it. In a relatively simple arrangement, the or each antenna 130 can be provided with a directional coupler 1205 fed from a terahertz source (not shown) in the signal path between the antenna 130 and its associated receiving equipment 1200.

The word "comprising" is intended to be broadly interpreted herein so as to include for instance at least the meaning of either of the following phrases: "consisting solely of" and "including amongst other things".

The invention claimed is:

1. A scanning system for scanning a field of view to provide a scanned terahertz radiation input to at least one terahertz radiation detector, for use in imaging the field of view, wherein said scanning system comprises at least one mobile component adapted to steer terahertz radiation to provide said scanned terahertz radiation input, and wherein said mobile component is also adapted to steer an electromagnetic tracking beam during scanning, for use in tracking movement of the mobile component.

2. A scanning system according to claim 1, further comprising at least one terahertz radiation detector mounted, in use, in a fixed position relative to the field of view.

3. A scanning system according to claim 1, comprising a plurality of terahertz radiation detectors mounted, in use, in fixed positions relative to the field of view.

4. A scanning system according to claim 1, further comprising an electromagnetic beam source for delivering a tracking beam to the mobile component to be steered thereby.

5. A scanning system according to claim 1, further comprising a spatially sensitive detector for detecting the position of the steered electromagnetic tracking beam in use of the system.

6. A scanning system according to claim 5, wherein the spatially sensitive detector comprises a charge coupled device array.

7. A scanning system according to claim 5, wherein the spatially sensitive detector comprises a sheet of material having a scattering property with respect to the electromagnetic tracking beam.

8. A scanning system according to claim 7 wherein the spatially sensitive detector further comprises an imaging component for forming an image of the sheet of material and delivering the image to an image storage component.

9. A scanning system according to claim 5, wherein the spatially sensitive detector is further sensitive to modulation of the electromagnetic tracking beam such that an output of the detector comprises an image of the field of view produced by scanned terahertz radiation.

10. A scanning system according to claim 1, wherein the electromagnetic tracking beam comprises an optical beam.

11. A scanning system according to claim 1, wherein the mobile component comprises a steering element for steering the electromagnetic tracking beam.

12. A scanning system according to claim 11 wherein the steering element comprises retractive material for steering the tracking beam at least partially by refraction.

13. A scanning system according to claim 12 wherein the steering element comprises a prism.

14. A scanning system according to claim 11 wherein the steering element comprises reflective material for steering the tracking beam at least partially by reflection.

15. A scanning system according to claim 11 wherein the steering element comprises a diffractive element for steering the tracking beam at least partially by diffraction.

16. A scanning system according to claim 1, wherein an output of the terahertz radiation detector is connected to a modulator for modulating the electromagnetic tracking beam.

17. A scanning system according to claim 1, wherein the mobile component comprises a resonant scanning mirror, being adapted to steer said terahertz radiation, in use, by means of a reflective surface.

18. A scanning system according to claim 1, wherein an image of the field of view is produced by integrating an output of the terahertz radiation detector to produce each one of a plurality of pixels of said image, the system further comprising a drive mechanism for moving the mobile component to scan the field of view, and wherein an image of the field of view is produced by integrating the output of the terahertz radiation detector for each pixel over more than one complete scan of the field of view.

* * * * *